J. E. BILLINGTON.
DISTRIBUTING MECHANISM OF TYPOGRAPHICAL COMPOSING AND CASTING MACHINES.
APPLICATION FILED APR. 5, 1921.

1,427,511.

Patented Aug. 29, 1922.
12 SHEETS—SHEET 1.

Inventor.
John E. Billington
By Rogers, Kennedy & Campbell
Attorneys

J. E. BILLINGTON.
DISTRIBUTING MECHANISM OF TYPOGRAPHICAL COMPOSING AND CASTING MACHINES.
APPLICATION FILED APR. 5, 1921.
1,427,511. Patented Aug. 29, 1922.
12 SHEETS—SHEET 2.
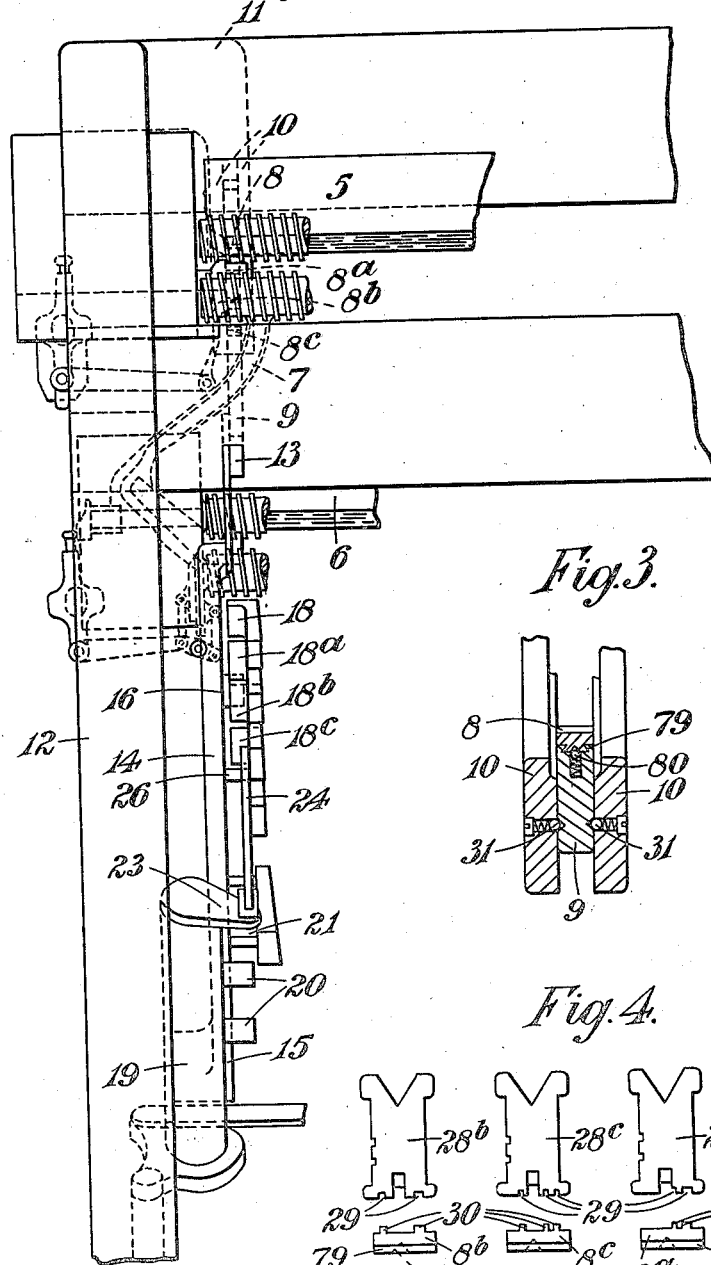

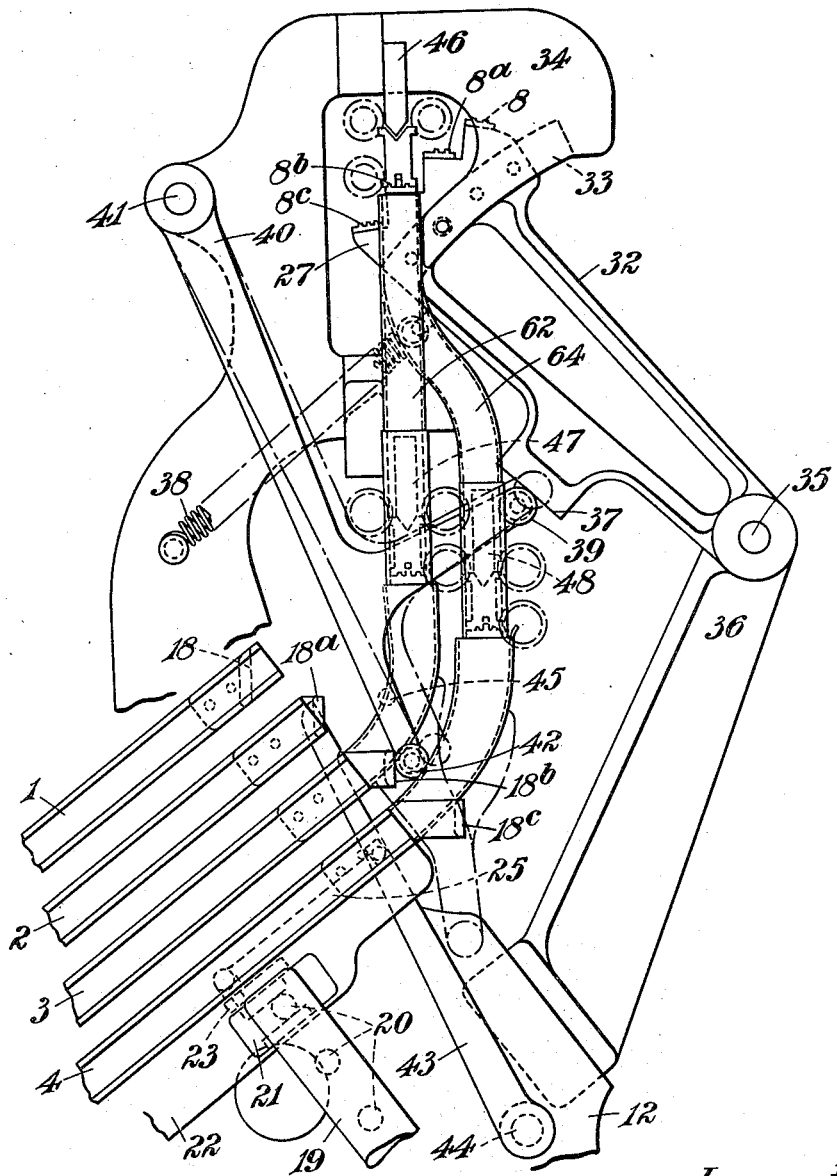

J. E. BILLINGTON.
DISTRIBUTING MECHANISM OF TYPOGRAPHICAL COMPOSING AND CASTING MACHINES.
APPLICATION FILED APR. 5, 1921.
1,427,511.
Patented Aug. 29, 1922.
12 SHEETS—SHEET 4.
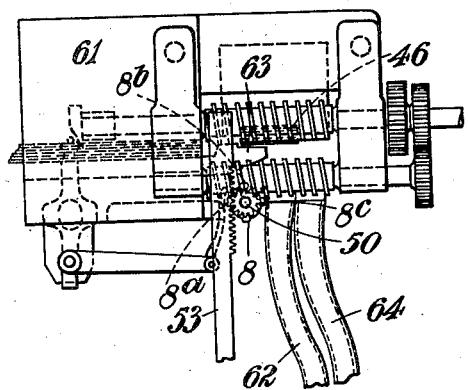
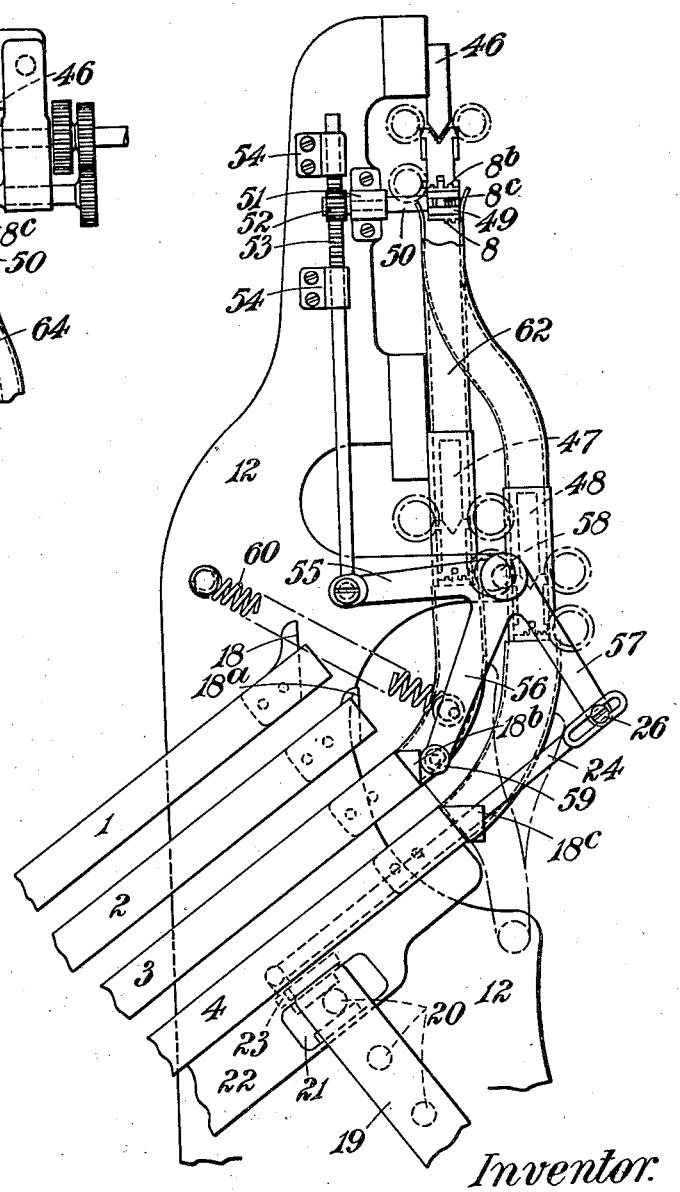

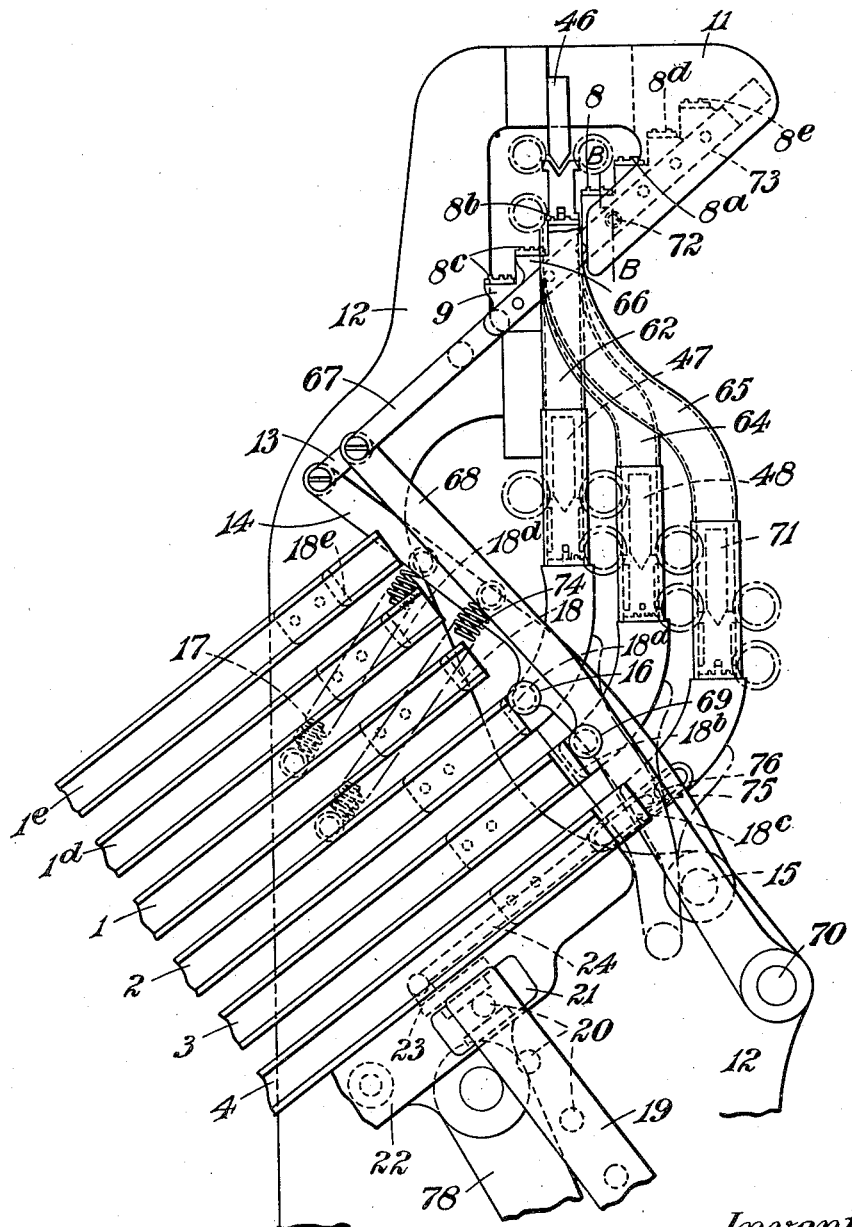

J. E. BILLINGTON.
DISTRIBUTING MECHANISM OF TYPOGRAPHICAL COMPOSING AND CASTING MACHINES.
APPLICATION FILED APR. 5, 1921.

1,427,511.

Patented Aug. 29, 1922.
12 SHEETS—SHEET 6.

Inventor:
John E. Billington
By Rogers, Kennedy & Campbell
Attorneys

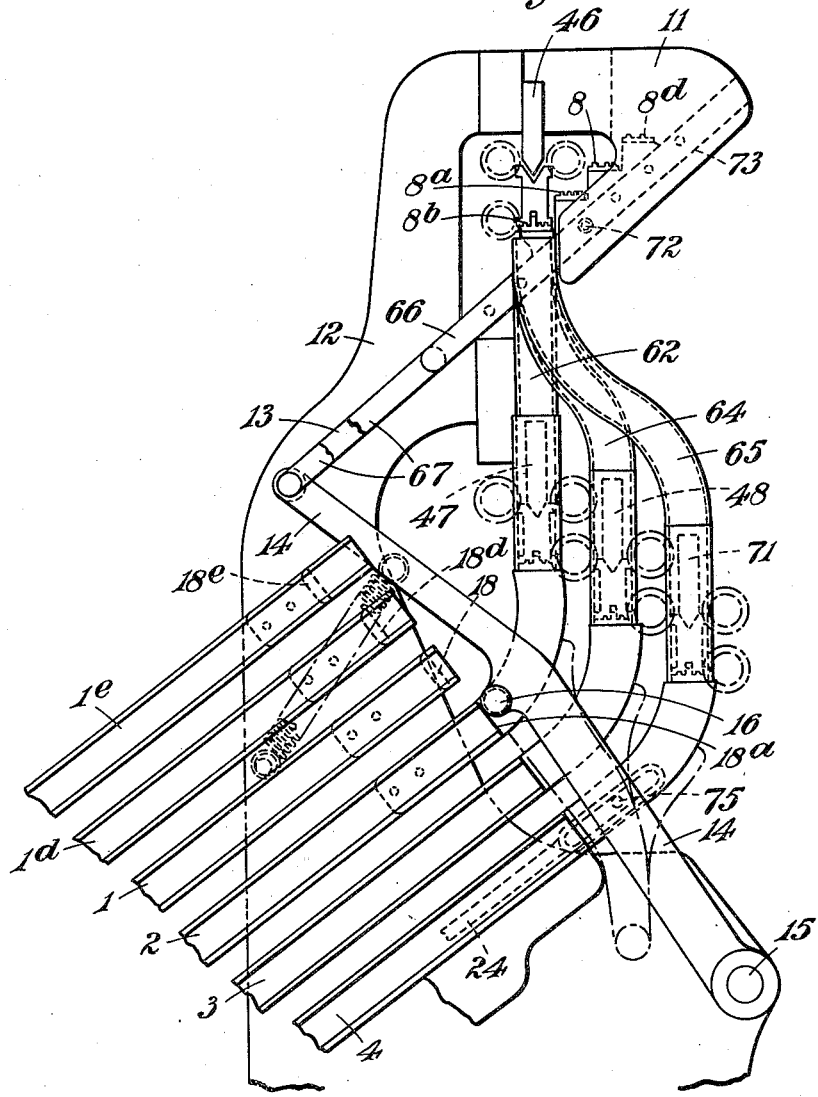

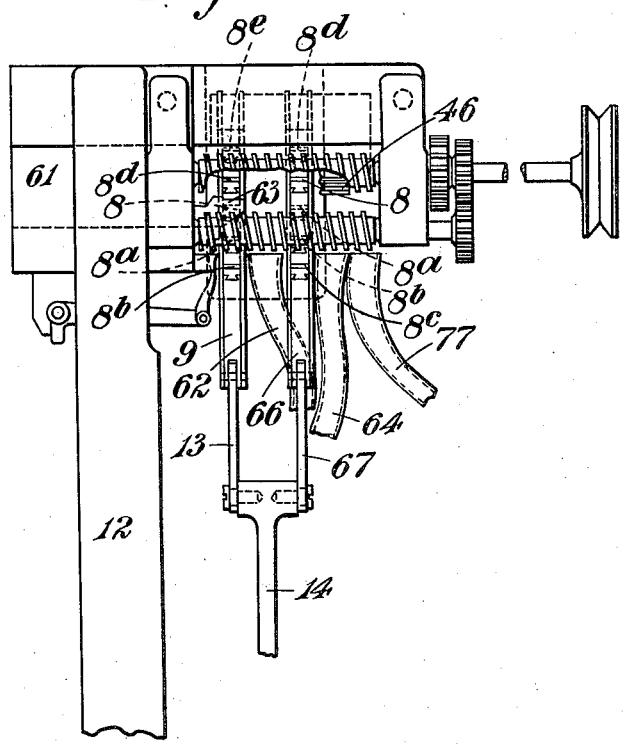

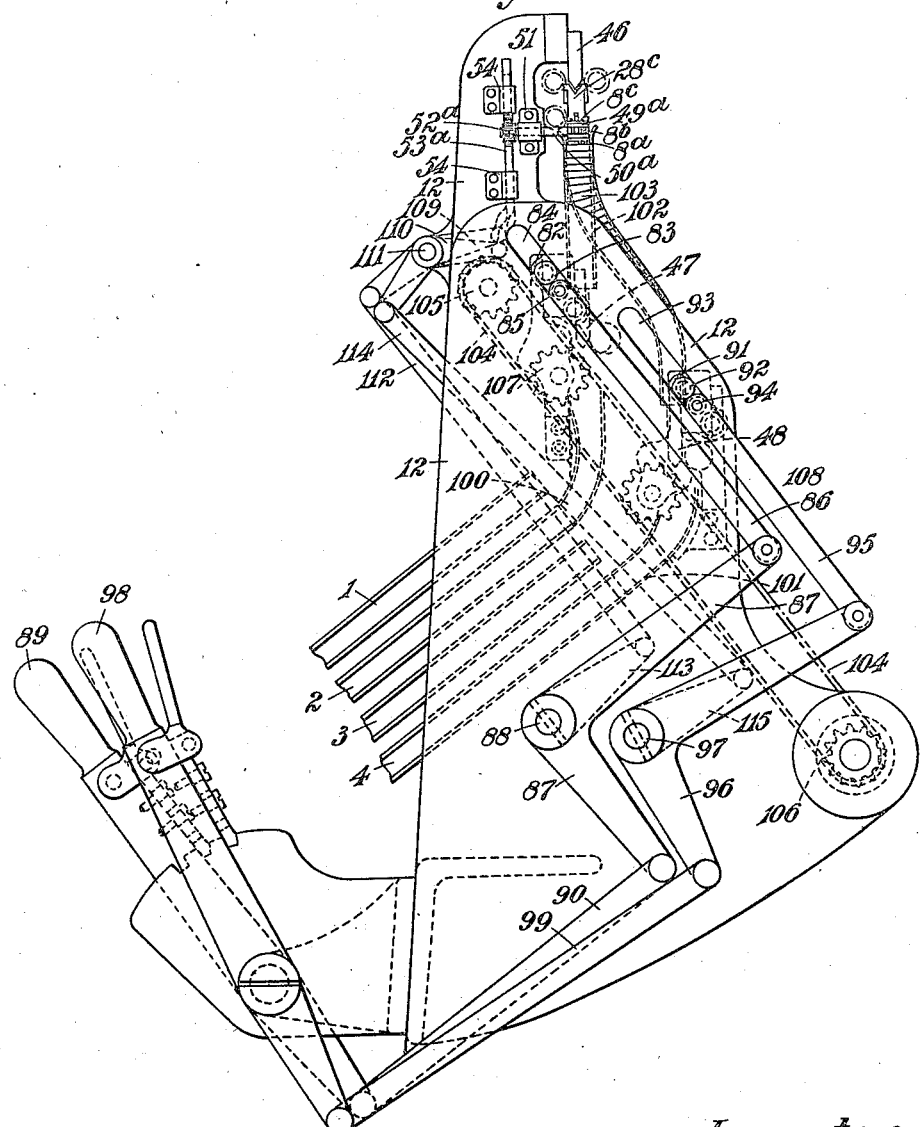

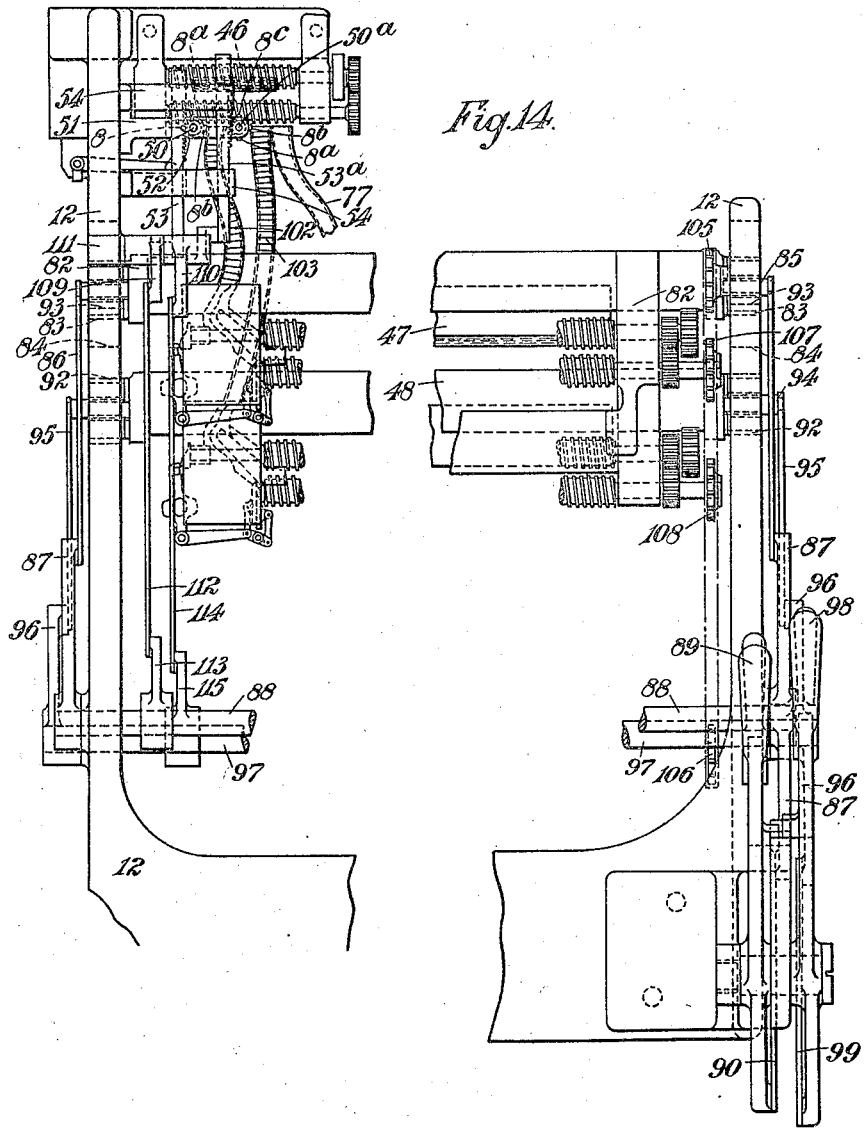

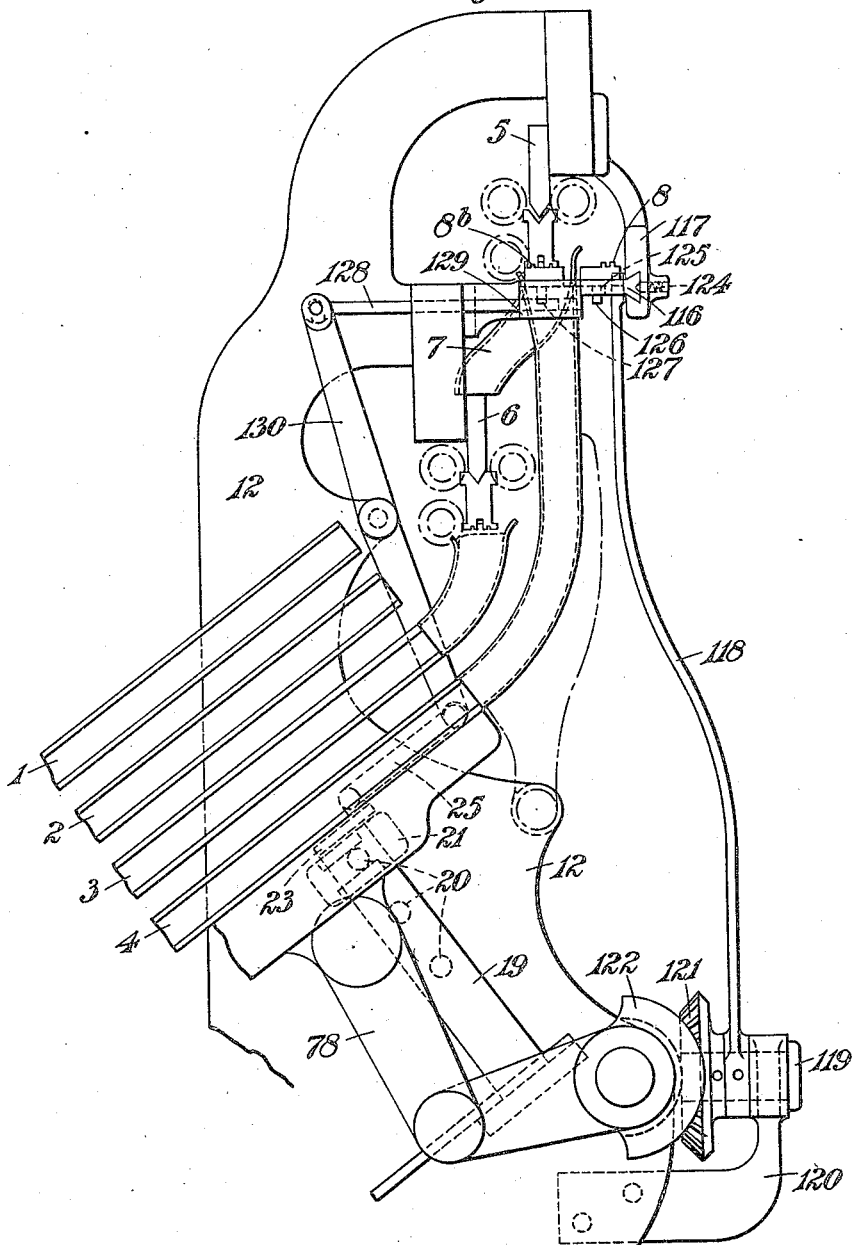

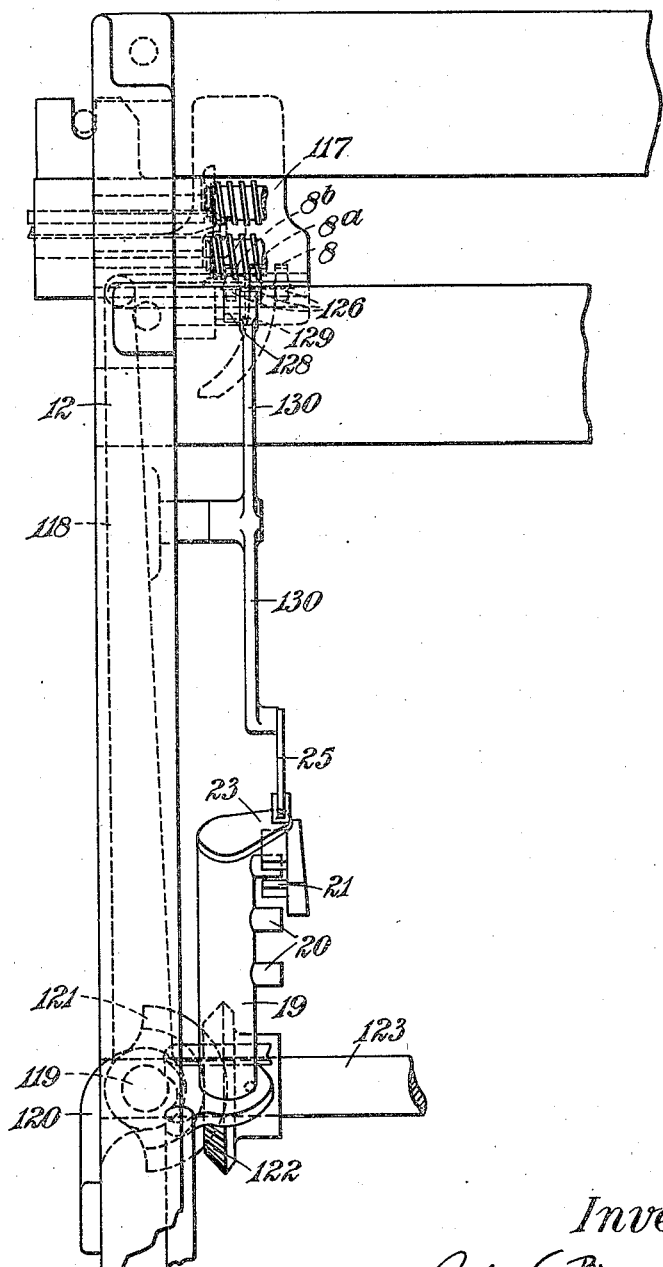

UNITED STATES PATENT OFFICE.

JOHN ERNEST BILLINGTON, OF ALTRINCHAM, ENGLAND, ASSIGNOR TO LINOTYPE AND MACHINERY LIMITED, OF LONDON, ENGLAND.

DISTRIBUTING MECHANISM OF TYPOGRAPHICAL COMPOSING AND CASTING MACHINES.

1,427,511. Specification of Letters Patent. Patented Aug. 29, 1922.

Application filed April 5, 1921. Serial No. 458,817.

*To all whom it may concern:*

Be it known that I, JOHN ERNEST BILLINGTON, a subject of the King of the United Kingdom of Great Britain and Ireland, and residing at "Ravenscroft," Oldfield Road, Altrincham, in the county of Chester, England, have invented new and useful Improvements in or Relating to the Distributing Mechanism of Typographical Composing and Casting Machines, of which the following is a specification.

This invention relates to improvements in the distributing mechanism of typographical composing machines such as those known commercially under the trade mark "Linotype." More particularly it relates to that type of such machines which is equipped with a plurality of magazines containing matrices of respectively different fonts or faces, and a smaller plurality of simultaneously-operating distributors capable of working in conjunction with different groups of the magazines.

For the purpose of enabling a number of different fonts to be properly distributed into a plurality of magazines by a corresponding plurality of distributors, it is customary to provide the matrices with distinguishing notches in their feet which, co-operating with ridged bridges over which the matrices pass on their way to the distributors, effect a selection of the matrices according to font and ensure their being presented to the appropriate distributors. In connection with such arrangements, manually adjustable selector bridges have been provided as a means of readily accommodating the distributors to a change of magazine or magazines.

In a machine of the type to which this invention relates, however, the function of a plurality of distributotrs as regards their co-operation with the magazines (hereinafter termed the co-operating function), is variable to the extent that each distributor may be called upon, during the normal operation of the machine, to co-operate with different magazines of the series. Hence it is necessary for the font-selecting function of the distributing mechanism as a whole to be variable to the same extent, and desirably with the same facility, as its co-operating function. The utility of machines of the type in question, as heretofore constructed, has been considerably restricted by the absence of such variability. It has been proposed to overcome this defect by the employment of the known forms of adjustable font distinguishers, such, for example, as that described in the specification of Letters Patent No. 1109696; the function of such distinguishers, however, is essentially rejective, and the variability of the rejective function is limited by the practicable number of different positions in which a single distinguishing notch can be used on the foot of a matrix, so that the use of such font distinguishers does not afford the desired facilities.

The object of the present invention is to provide, in connection with a plurality of distributors having a variable co-operating function, a new or improved automatically variable font-selecting mechanism which will ensure the delivery to each distributor of matrices intended for the magazine with which it is for the time being co-operating, and which may be adapted, if desired, for preventing matrices of any font being under any circumstances distributed into a magazine containing matrices of another font, a result which has not been attained by the methods heretofore proposed.

In carrying the invention into effect, a range of variability of font selection sufficiently great for all practical requirements, may be secured by employing different positions or combinations of either one, two or three font distinguishing notches in the feet of the respective matrices, in conjunction with font-selecting bridges of known type, having corresponding positions or combinations of relatively fixed blades or ridges, and the invention is concerned with the provision of means whereby the accurate positioning in the path of the matrices of an appropriately ridged bridge or bridges, may be effected by or through, and simultaneously with, an adjustment necessary for securing the co-operation of the respective distributor or distributors with any particular magazine or magazines of the series.

The invention will now be described by reference to the accompanying drawings, which are to be taken as part of this specification and read therewith. In these drawings:

Figures 1 and 2 are, respectively, a right-hand side and front elevation of a portion of the distributing mechanism and adjacent parts of a machine embodying one constructional form of the present invention;

Figure 3 is a section on the crooked line A—A of Figure 1, on an enlarged scale;

Figure 4 shows in elevation examples of selector-bridge and matrix-notch combinations;

Figure 5 is a view, similar to Figure 1, showing a second constructional form of the invention;

Figures 6 and 7 are views respectively similar to Figures 1 and 2, of a third constructional form;

Figures 8 and 9 are, respectively, a right-hand side elevation and a front elevation of a fourth constructional form;

Figure 11 is a right-hand side elevation of a modified form of the arrangement shown in Figures 8 and 9;

Figure 12 is a front elevation of the arrangement illustrated in Figure 11 as adapted for selective distribution to two magazines;

Figure 13 is a right-hand side elevation showing the invention applied to a machine provided with distributors adjustable into operative relationship with different magazines of a fixed column;

Figure 14 is a front elevation, partly broken away, of the construction illustrated in Figure 13, and Figures 15 and 16 are, respectively, a right-hand side elevation and a front elevation of a further form of the invention, applied to a machine similar to that illustrated in Figures 1 and 2.

Throughout the several figures of the drawings like reference numerals are used to indicate like or corresponding parts, it being explained that where any group or series of devices is hereinafter referred to as a whole, the reference numeral of the first of the series only is employed.

Figure 1:
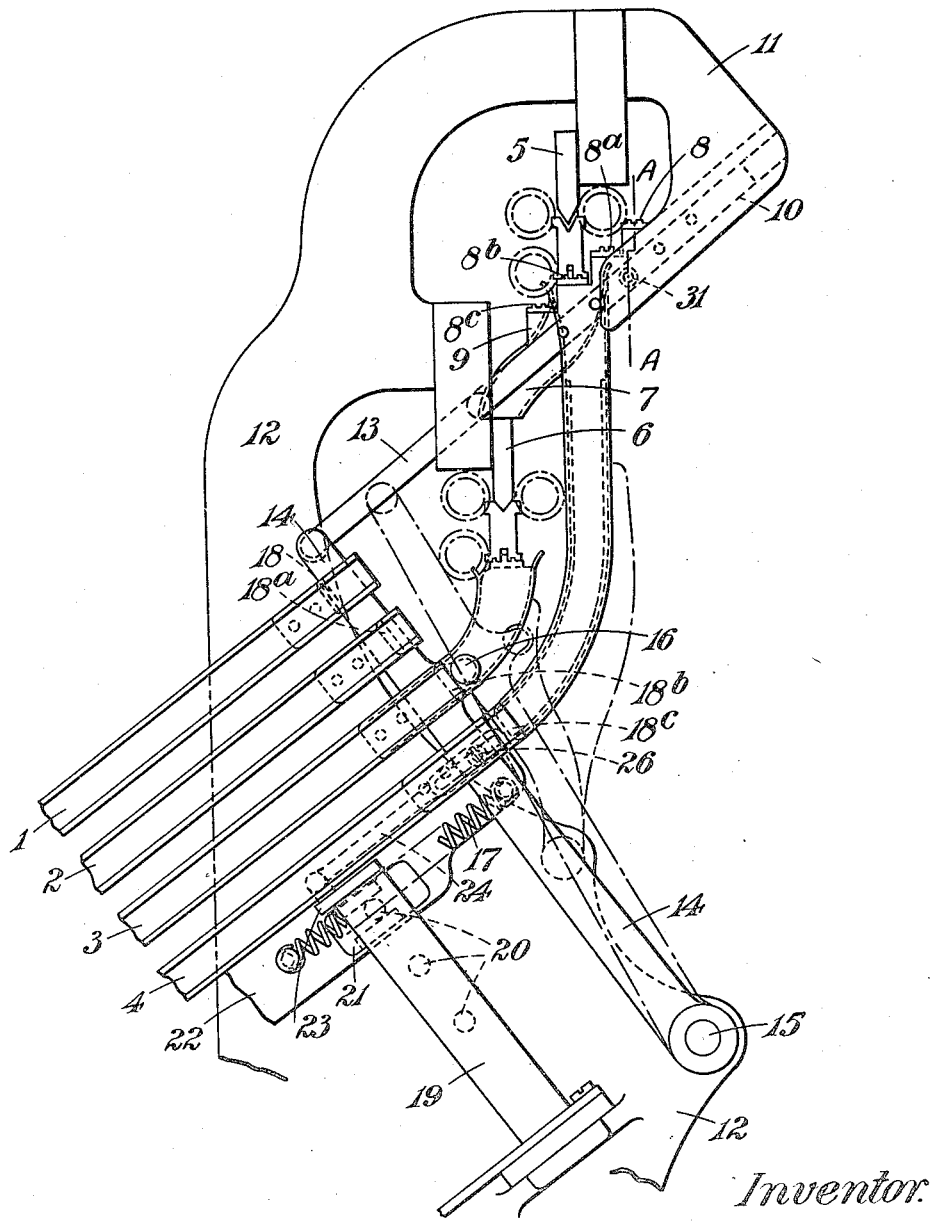

Referring first to figures 1 to 4, the invention is therein illustrated in a constructional form which may be conveniently applied to a machine having a column of, say, four magazines 1, 2, 3, 4, adjustable in known manner (as for example by means hereinafter more particularly referred to in connection with Figure 8) to bring different pairs thereof into operative relationship with two fixed distributors 5, 6, the former higher than the latter. In such an arrangement, as heretofore constructed, the font selection has been effected by means of a fixed central rail at the receiving end of the upper distributor 5, co-operating with a central notch in the feet of the matrices appertaining to the magazine served by the lower distributor 6, which latter matrices will consequently ride over the rail at a level too low to engage the permuted bar of the upper distributor 5, and will drop over the rail to be conducted by a chute 7 to the lower distributor 6, while un-notched matrices appertaining to the magazine served by the upper distributor 5, will ride on the rail and be dealt with by that distributor. With a fixed rail of this kind, the co-operating function of the two distributors is necessarily limited to definite pairs of the plurality of magazines, for example, the two pairs comprising respectively the magazines 1 and 2, and the magazines 3 and 4 of the arrangement illustrated, because the matrices contained in all magazines which are at any time to be served by the lower distributor must bear the distinctive central notch.

According to the constructional form of the invention now to be described, the distributors are enabled to co-operate automatically with any two adjacent magazines, by providing a font-selecting unit comprising a series of font-selector bridges 8, 8$^a$, 8$^b$, 8$^c$, mounted stepwise on a slide 9 working in guides 10 formed in a bracket 11 attached to a convenient part of the machine frame 12, and means whereby the slide 9 may be automatically moved to bring any desired one of the front-selector bridges into the path of matrices being presented to the upper distributor 5. The last-mentioned means may conveniently comprise a link 13 pivoted at opposite ends to the slide 9 and a lever 14 (hereinafter termed the font-selector lever), pivoted at 15 to the machine frame 12, which lever is provided with a bowl 16 held, as by a spring 17, in contact with the face of one of a series of registering blocks 18, 18$^a$, 18$^b$, 18$^c$, located near the upper end of the respective magazine 1, 2, 3, 4.

For convenience of illustration, the magazines are omitted from figure 2, although the blocks 18, 18$^a$, 18$^b$, 18$^c$ are themselves represented in that figure.

In connection with a column of adjustable magazines such as that above referred to, it is usual to provide magazine-locating means which must be disconnected prior to any movement of the column (see Patent No. 1,116,621), and such means may be utilized in conjunction with the present invention for the purpose of preventing the before-mentioned registering blocks 18 fouling the bowl 16 during the movement of the column of magazines. In the example illustrated, the magazine-locating means comprises a number of turrets 19, carrying studs 20 respectively adapted to engage with gapped blocks 21 on the magazine frames 22 in different adjusted positions of the column, suitable means (not shown in the drawings) being provided for turning the turrets to effect the disengagement and engagement of the studs 20 and gapped blocks 21 before and after movement of the column of magazines. Only one of the gapped blocks 21 and one of the turrets 19 are represented in Figure 1, the said turret being provided with a crank arm 23 connected to one end of a slotted link 24, the slotted end of which embraces a stud 26 on the font-selector lever 14, so that when the turret 19 is turned prior to moving the column of magazines, the slotted link 24 will push the font-selector lever 14 to the position in which it is shown in dotted lines in Figure 1, that is to say, far enough to the rear of the machine to hold the bowl 16 clear of the path of the rearmost registering block $18^c$.

An example of selector-bridge and matrix-notch combinations suitable for use in carrying out the present invention is illustrated in Figure 4, and for the purpose of describing the operation of the invention, it may be assumed that matrices 28, $28^a$, $28^b$, $28^c$ having font-distinguishing notches 29 in the respective positions indicated, will be stored in the respective magazines 1, 2, 3 and 4, and that selector-bridges 8, $8^a$, $8^b$, $8^c$, having ridges 30 corresponding to the respective matrix notches, will be located on the slide 9 in the order named, bridge 8 appropriate to matrices 28 stored in magazine 1 being the uppermost. It is to be understood, however, that the particular combinations referred to, as well as the order of the magazines in the column and of the bridges on the slide are chosen merely as examples, and may be varied to any extent within the scope of the invention, provided the ridges 30 on the selector-bridge at any time in operative position correspond to the notches 29 of the matrices contained in the magazine for the time being served by the lower distributor. Each bridge 8 is removably mounted on the slide 9, as by a dovetail 79 engaging a corresponding groove in the latter (see particularly Figure 3) and positioned by a spring detent such as 80 co-operating with a recess 81 in the bridge, so that any desired changes may be readily effected.

In Figure 1 magazines 3 and 4 are shown in operative position, bridge $8^b$ being operatively located in the distributor by the registering block $18^b$ on the magazine 3. Distribution, in known manner, of matrices $28^b$, $28^c$, to their respective magazines 3, 4, will consequently be effected correctly by reason of the fact that the notches 29 in matrices $28^b$ will straddle the ridges 30 on bridge $8^b$, and allow those matrices to fall through the chute 7 to the distributor 6, while matrices $28^c$ will ride over those ridges and be dealt with by the upper distributor 5. When it is desired to effect a change of the magazines in operative position, the magazine column is first unlocked by turning the turrets 19, which operation will, as explained above, simultaneously effect the movement of the lever 14 to the position in which it is shown in dotted lines in Figure 1, so that the column of magazines may be moved freely up and down by any of the known means. The desired movement of the column having been effected, say, for example, to bring magazines 2 and 3 into operation, the return movement of the turrets 19 to effect the engagement of the respective studs 20 with the gapped blocks 21, will allow the spring 17 to bring the bowl 16 of the lever 14 into contact with the registering block $18^a$ of magazine 2, thus operatively locating the bridge $8^a$ in the distributor. The accurate positioning of the respective bridge may be assisted by spring detents 31 (Figure 3) in the guides 10, engaging recesses in the slide 9. Distribution of matrices $28^a$, $28^b$, to their respective magazines 2 and 3 will now be effected by the bridge $8^a$ in the same manner as that described above in connection with the bridge $8^b$ and the matrices $28^b$, $28^c$. Correspondingly, when magazines 1 and 2 are brought into operative position, bridge 8 will be operatively located to distribute matrices 28 and $28^a$ into their respective magazines. It will thus be seen that, in the use of the machine, a magazine at one time will be operatively connected to the lower distributor 6 and at another time to the upper distributor 5, the means just described acting automatically to adjust the font selecting mechanism so as to effect the delivery of the matrices contained in said magazine to the particular distributor with which it is connected. It may also be explained that, in the foregoing arrangement, the magazines are interchangeable in position with each other, this being permitted by the location of the registering blocks on the magazines. For instance, while as shown the magazine 4 is the lowermost one of the series, it is free to be interchanged in position with any one of the three overlying magazines, its registering block $18^c$ acting under such condition to position the selector bridge $8^c$ in the path of the matrices when said magazine is brought into operative relation to the lower distributor 6.

The before-described arrangement may be equally well applied to a machine employing a preliminary font separator 46, such as that shown in Figure 5, which effects the separation of the matrices according to font and delivers them to chutes 62, 64, by which they are conveyed to the respective distributors 47, 48, the slide in that case being arranged to work in conjunction with the preliminary font separator. Figure 5, however, shows a modified constructional form of font selecting unit in which the selector bridges 8 are carried on a sector 27 oscillating in arcual guides 33 formed in a bracket 34 on the machine frame. The sector arm 32 is pivoted at its lower end 35 to a fixed bracket 36, and has an intermediate bearing surface 37 held, as by a spring 38, in contact with a roller 39 on a rearwardly extending arm of a font-selector lever 40. This lever 40 is pivoted at its upper end on a stud 41 and is provided at its lower end with a roller 42 in a position to contact with the particular registering block 18, caried by the upper magazine of the particular pair which, at any time, is in operative position. For the purpose of keeping the font-selector lever 40 clear of the registering blocks 18 during the columnwise adjustment of the magazines, a modified form of the arrangement above referred to in connection with Figures 1 and 2, may be used. For instance, the link 25 attached to the crank arm 23 is, in the example now under review directly connected to a lever 43 pivoted at its lower end on a stud 44 and having its upper end standing normally in front of a stud 45 on the font-selector lever 40, with sufficient clearance to allow that lever to occupy its several positions without contacting with the lever 43. When the turret 19 is moved for releasing the magazine column, the lever 43 will be operated, and, through the stud 45, will move the font-selector lever 40 to the rear to the position in which it is shown in dotted lines. The operation of this arrangement is otherwise in all respects similar to that described with reference to Figures 1 to 4, it being understood that matrices corresponding to the particular selector-bridge 8 in operative position, will fail to engage the ribbed bar 46 (which reference is also used herein, for convenience, to designate the font-separator as a whole), and fall through the first chute 62 to the distributor 47, while other matrices will engage the bar 46, fall off the end of the ribs thereof, and be delivered to the distributor 48 through the chute 64.

Instead of the font-selector bridges 8 being mounted as hereinbefore described, they may be distributed around a rotating drum or prism, and suitable means may be provided for ensuring automatic angular adjustment of the drum to the desired extent for the purpose of bringing a particular selector bridge into the operative position. An example of such a constructional form of the invention is illustrated in Figures 6 and 7, in connection with a machine employing a preliminary font separator 46 and two main distributors 47 and 48 as in the arrangement last described. The drum 49 is fast to a spindle 50 journalled in a stationary bracket 51. The front end of the spindle 50 has fast on it a toothed pinion 52 in mesh with an upstanding rack 53 guided in stationary brackets 54 and attached by a stud and slot to one arm 55 of the font-selector lever, which in this case has three arms 55, 56, 57 and is pivoted to the machine frame at 58. The middle arm 56 of the font-selector lever carries a bowl 59 pulled as by a spring 60, into contact with the registering block of the upper of the two magazines in operative position, which in the example illustrated, is the block $18^b$. The slotted link 24 engages with a stud 26 on the third arm 57 of the font-selector lever, and is employed, as previously described, for keeping the font-selector lever clear of the registering blocks 18 during the columnwise movement of the magazines. In this arrangement, the particular registering block 18 in contact with the font-selector lever determines the vertical position of the rack 53, and consequently also the positioning of the appropriate bridge 8 in the path of the matrices from the distributor box 61. Figure 7 shows that the drum 49 is located between the end of the distributor box 61 and the first chute 62, the rails 63 of the distributor box 61 being sufficiently long to sustain the matrices whose notches have engaged the ridges of the bridge $8^b$, in position up to the chute 62.

Figure 9:
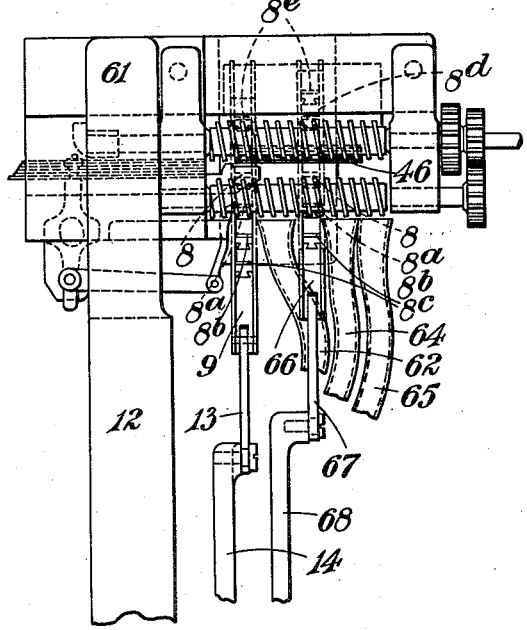
Figure 10:
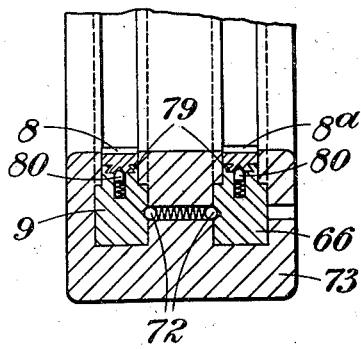
Figure 10 is an enlarged sectional view taken on the crooked line B—B of Figure 8.

It is to be understood that although the constructional forms of the invention dealt with above are referred to in connection with two distributors operating simultaneously in conjunction with a plurality of magazines operable in pairs, the invention is equally applicable to, say, three or more distributors in use with a plurality of magazines operable in different series, each series comprising a number of magazines corresponding to the number of distributors. Figures 8, 9, and 10 show such an extended application of the invention to a machine in which six magazines are used with three distributors and three assembler entrances, (the latter not shown in the drawings), making possible the use of four different groups of three magazines by columnwise movement of the latter. Such columnwise movement may be effected by any of the well-known means, of which the lever-actuated link 78 may form a part. For convenience of description it is assumed that the column of six magazines illustrated comprises the magazines 1, 2, 3, 4, of the previously described arrangements with two additional magazines $1^d$, $1^e$, added at the top of the column. A preliminary font separator 46 is shown with chutes 62, 64, 65 leading to the three main distributors 47, 48, 71. A slide 9 is located between the distributor box 61 and the first chute 62, and a second slide 66 located between the first chute 62 and the second chute 64. The slide 9 is operated as in the first described arrangement through a link 13 by a font-selector lever 14 whose bowl 16 co-operates with the registering block of the uppermost magazine of the three in operative position, which in the example as illustrated in Figure 8 is the block $18^a$. The lower end of the font-selector lever 14 is pivoted at 15 to the machine frame 12. The slide 66 is similarly operated through a link 67 by a font-selector lever 68 having a bowl 69 co-operating with the registering block of the middle magazine of the three in operative position, and pivoted at 70 to the machine frame 12. Each of the slides 9, 66, carries six selector bridges, i. e., two ($8^d$ and $8^e$) in addition to those of the before-described arrangements, each one with the proper combination of ridges for the matrices of the respective magazine, the bridges being arranged in the same order on both slides so that, as the levers 14 and 68 are of the same ratio, a selector-bridge appropriate to the matrices of the respective magazine will be located in the font separator by any one of the registering blocks through either of the levers. As will be seen from Figure 9, the slide 9 of the first font-selecting unit operates between the distributor box 61 and the first chute 62, while the slide 66 of the second font-selecting unit operates between the first chute 62 and second chute 64. Separation of the matrices by font, according to the particular selector bridges in operative position, is therefore effected in the known manner; matrices to be dealt with by the uppermost main distributor 47 fail to engage the ribbed bar 46 and drop through the chute 62, while matrices for the distributor 48, on passing a gap in the ribs on the bar 46, drop over the second selector bridge into the chute 64, and matrices for the distributor 71 are sustained by that bridge and continue to travel along the bar 46 until they drop into the chute 65. Accurate positioning of the slides 9 and 66 is assisted by a spring detent, such as that illustrated in Figure 10, which consists of a double ball plunger 72 nested in a hole in the wall of the guide 73 between the guideways of the two slides. Springs 17 and 74, and the slotted link 24 engaging studs 75, 76 on the levers 14, 68, are employed for holding those levers in contact with the registering blocks, and moving them clear of the magazine column during the movement of the latter, in the manner explained above in connection with the construction illustrated in Figures 1 and 2.

If it be desired to use any magazine in any position in the column, each font-selecting unit must obviously be complete and operable independently of all the others; but where, on the contrary, the relative positions of the magazines in the column is constant, the construction may be simplified by connecting together the bridge-carrying members so that they may be moved in unison by a single font-selector lever acting in conjunction with only one, say the uppermost, magazine of each operable series. Such a simplification of the construction illustrated in Figures 8 and 9 is exemplified in Figure 11, the two slides 9, 66 (the former being obscured by the latter in this figure) being directly connected through the links 13, 67 to one and the same font-selector lever 14 adapted to co-operate with the uppermost magazine of each operative series. As in this arrangement the operative series are restricted to four, comprising respectively the magazines $1^e$, $1^d$ and 1, $1^d$, 1 and 2, $1^t$, 2 and 3, and 2, 3 and 4, always juxtaposed in the order stated, with the uppermost magazine of each series controlling the position of the font-selector bridges, only the four uppermost magazines need be provided with registering blocks. Similarly only four font-selector bridges are required on each slide 9, 66, so arranged that the two bridges in operative position for each position of the font-selector lever 14 shall respectively correspond with the notches of the matrices in the two upper magazines of the respective operative series. In the arrangement illustrated, therefore, the font-selector bridges on slide 9 (which, as before mentioned, is obscured by slide 66 in Figure 11) would be $8^e$, $8^d$, 8 and $8^a$, in that order from top to bottom of the slide, and the corresponding font-selector bridges on slide 66 would be $8^d$, 8, $8^a$ and $8^b$ as shown. Excepting as regards the just-mentioned modifications, the details and method of operation of the present constructional form of the invention are similar to those already referred to in connection with Figures 8, 9 and 10, and will therefore be readily understood without further description.

It will be observed that in all the hereinbefore described arrangements, the number of adjustable font-selecting units is one less than the number of distributors. Under these circumstances the font-selecting function does not extend to the last magazine of each operable series; in other words, matrices for all excepting such last magazine will be definitely selected and directed to the appropriate distributors, but all matrices of whatever font not so selected will be delivered to the last magazine. Hence this method cannot operate satisfactorily when there is any risk of matrices being presented for distribution which are not intended for any of the magazines at the time in operative relationship with the distributors. It is therefore an important advantage of the present invention that it may readily be adapted, by the provision of an additional font-selecting unit, to effect definite selection of matrices for all the magazines of the operable series, thereby obviating all risk of matrices being delivered to a wrong magazine, a pi-receptacle of known form being provided to receive any matrices not appertaining to any of the magazines then in operation. As an example of the just-mentioned constructional form of the invention, Figure 12 shows, in front elevation, font-selecting mechanism arranged for use with a column of six magazines such as described in connection with Figure 11, but adapted for selective distribution to successive pairs of such magazines through only two main distributors. In this example, both slides 9 and 66 are operated together through links 13, 67, by a single font-selector lever 14 controlled by one, say the upper, magazine of the respective operative pair. The font-selector bridges on the slides 9, 66 may conveniently be arranged as in the example last described with an additional bridge on each slide respectively corresponding with the matrices stored in the two lowermost magazines. Thus bridges $8^e$, $8^d$, 8, $8^a$ and $8^b$ on slide 9, and bridges $8^d$, 8, $8^a$, $8^b$ and $8^c$ on slide 66, arranged in the order stated from top to bottom of the respective slide, would effect the desired selective distribution to the successive pairs of magazines $1^e$ and $1^d$, $1^d$ and 1, 1 and 2, 2 and 3, 3 and 4. For example, with the font-selector bridges set by the lever 14 in the position in which they are shown in Figure 12, magazines 2 and 3 constitute the operative pair, and matrices to be distributed thereto pass first over the bridge $8^a$, which allows matrices for the magazine 2 to drop into the chute 62 to be delivered thereby to the upper main distributor (say 47 as in Figure 11) then co-opeating with that magazine. Matrices not so dropped pass along the bar 46 and over the bridge $8^b$, which allows matrices appropriately notched for the magazine 3 to drop through the chute 64 to the lower main distributor (say 48 as in Figure 11). Any matrices still retained by the bar 46 drop off the end of the latter into a so-called "pi-chute" 77, by which they are conveyed to a pi-bowl or pi-stacker of known form. Consequently, with this arrangement definite selection of the matrices for each magazine is effected. Although just described in connection with conjointly operated bridge-carriers and a column of non-interchangeable magazines, it will be obvious that the same method can equally well be adopted with independently operated font-selecting units employed with magazines whose position in the column may be varied as desired.

As hereinbefore described, the invention is dealt with solely as applied to stationary distributors operating in conjunction with a column of movable magazines, but it is equally applicable to the known type of machine in which a column of stationary magazines is employed and the co-operative function of the distributors is varied by movement of the distributors into operative relationship with different magazines. An application of the invention to a machine of the just-named type is illustrated in Figures 13 and 14, wherein a column of fixed magazines 1, 2, 3, 4 is shown in conjunction with upper and lower main distributors 47, 48, adjustable relatively thereto. In the constructional form illustrated, the distributor 47 is carried by a pair of brackets 82, each provided with rollers 83 working in slots 84 in opposite sides of the frame 12, and with a stud 85 pivotally connected by a link 86 to a lever arm 87 fast to a shaft 88 which is rocked by a hand lever 89 through a link 90 connected to the arm 87 on the right-hand side of the machine, which there forms part of a bell-crank lever. Similarly, the distributor 48 is carried by brackets 91 having rollers 92 engaging slots 93, and is connected by studs 94, links 95 and levers 96 to a shaft 97 which is rocked by a hand lever 98 and link 99. The magazine entrances 100, 101 are carried by extensions of the respective brackets 82, 91, thus forming part of and moving with the distributors, and the chutes 102, 103 for conveying matrices from the font-separator 46 to the respective distributors 47, 48, are telescopic or flexible so that the connection between the font-separator 46 and the distributors is maintained whatever the position of the latter. The distributor screws are driven in every position of the respective distributor, by means of an endless chain 104 passing round two sprocket wheels 105, 106 connected with the main driving mechanism, the said chain 104 engaging sprocket wheels 107, 108 each fast on one of the screws of the respective distributor 47, 48.

A convenient form of adjustable font-selector according to the present invention for use in conjunction with distributors of the construction just described, is that hereinbefore referred to in connection with Figures 6 and 7, wherein the font-selector bridges are mounted on an angularly adjustable drum 49. In the case of two adjustable distributors such as those shown in Figure 13, however, it is desirable to provide two such drums, one for each of the distributors. For this purpose, the brackets 54, 51 of the previously described construction may, as shown best in Figure 14, be conveniently extended to provide guides for a second rack $53^a$ and a bearing for the spindle $50^a$ of a second drum $49^a$ located between the chutes 102, 103. In order to provide for the automatic adjustment of the drums 49, $49^a$ simultaneously with the movement of the respective distributors 47, 48, two levers 109, 110 are fulcrumed on a pivot 111 secured in a convenient position to the frame 12, one arm of the lever 109 being connected to the rack 53 and the other arm thereof to a link 112 which in turn is pivotally connected to a lever-arm 113 fast on the shaft 88, while the lever 110 is similarly connected to the rack 53ª and, by link 114, to a lever arm 115 on the shaft 97.

With the four-magazine, two distributor arrangement as illustrated, it will be seen that the full range of adjustment of the distributors enables the upper distributor 47 to co-operate with any one of the magazines 1, 2 or 3, and the lower distributor 48 to co-operate with any one of the magazines, 2, 3 or 4. Consequently, assuming the adoption of the selector-bridge and matrix-notch combinations previously described, it will be necessary for drum 49 to be provided with the three selector-bridges 8, 8ª and 8ᵇ, and drum 49ª with the three selector-bridges 8ª, 8ᵇ and 8ᶜ, arranged thereon in the order shown in Figure 14, and for the ratios of the respective levers 87, 113, 109, and 96, 115, 110, to be so proportioned that the respective drum will be turned to bring its successive bridges into operative position as the appropriate distributor is moved into operative relationship with the successive magazines throughout its range of adjustment. Matrices for the two magazines at any time in operation will thus be delivered by the font-separator 46 to the respective chutes 102, 103, according to the method of separation hereinbefore more particularly referred to, while any matrices presented to the font-separator, which are not properly notched for distribution to such magazines may be conveyed, in known manner, to a pi-chute 77, which latter, though shown in Figure 14, is omitted from Figure 13.

The employment of the hereinbefore-described rectilinearly movable slides as bridge-carrying members, would involve, particularly in the case of machines having no preliminary font separator 46, the provision of a lower front distributor screw of a smaller diameter than that generally adopted, to permit the bridges to be moved freely without contacting therewith. A constructional form of the invention which obviates the necessity for any such deviation from the standard size of the distributor screws, is illustrated in Figures 15 and 16 in connection with a machine of the general construction hereinbefore described with reference to Figures 1 and 2. According to this arrangement, the font-selector bridges 8 are carried on a slide 116 at the rear of, and slidable in a direction parallel with the distributor 5 in a bracket 117 secured to the machine frame, which slide is automatically adjusted by means of a lever 118 fast on a short shaft 119 journaled in a stationary bracket 120. The shaft 119 has also fast on it a bevelled tooth sector 121 meshing with a similar sector 122 secured to a shaft 123 which constitutes part of the known mechanism for adjusting the magazine column, and which is rocked when any adjustment of such column is effected. Consequently, the position of the magazine column determines the location of one or other of the bridges 8 immediately to the rear of its operative position in the distributor, its retention in that position being conveniently assisted by a spring plunger 124 engaging recesses in the slide 116. The bridges 8 are arranged to slide fore-and-aft of the machine in dovetail grooves 125 on the slide 116 so as to be brought from the last-mentioned position into operative position in the distributor, and this fore-and-aft sliding is effected under the control of the before-described magazine-locating means in the following manner:—

Each bridge is provided on its underside with a projection 126 adapted to be engaged by a notch 127 in a rod 128 slidable fore-and-aft in a suitable guide in the machine frame and in a bracket 129 secured to said frame. The rod 128 at its forward end is connected to a lever 130 fulcrumed at a convenient part of the machine frame and operated by the before-described link 25 and crank 23 through the movement of the magazine-locating turret 19, the arrangement being such that when the magazine column is unlocked prior to adjustment, the rod 128 is moved to its rearward position and held there until the magazines are again locked, when it is moved forward and held in the position in which it is shown in Figure 15. Thus, when the magazine column is free to move, the rod 128 is in its rearward position, in which its notch 127 is in register with the projections 126 of the bridges 8. The slide 116 therefore moves freely under the action of the sectors 122, 121 and lever 118 when the magazine column is adjusted, and the bridges 8 are so located on the slide 116 that when any pair of the magazines is in operative position, the bridge appropriate to the matrices contained in the upper magazine of that pair will be in position immediately to the rear of its operative position in the distributor, with its projection 126 engaged by the notch 127 of the rod 128. When, thereafter, the magazine column is being locked in that position, the consequent movement of the rod 128, slides the respective bridge along its groove 125 and along the corresponding groove in the bracket 129 to its operative position. By these means bridge 8, 8ª or 8ᵇ will be located in operative position when the respective pair of magazines 1 and 2, 2 and 3, or 3 and 4 is operative and the distribution of matrices thereto will be effected in the before-described manner.

It is to be understood that the specific constructional forms hereinbefore referred to are given merely as examples, and may be varied without departing from the spirit of the invention. For instance, each magazine of an adjustable column may have rigidly attached to its upper end a bracket on which the respective font-selecting bridge is carried, so that the bridges will be moved, by the movement of the magazine column, in a path parallel to that of the ends of the magazines, the font-distributor being slightly tilted to enable the bridges to clear the distributor screws during such movement, and a fender or guard plate being provided to prevent matrices fouling the lower distributor screw when falling into the respective chutes.

It is pointed out that the term "font" is not used herein in any limiting sense but only in a general descriptive way. For instance, when in the appended claims the magazines are referred to as adapted to contain matrices of respectively different fonts, it is to be understood that this is intended to embrace matrix sets of different form and quite irrespective of the size or style of the matrices stored in the different magazines.

Having described my invention, I declare that what I claim and desire to secure by Letters Patent is:—

1. In a machine such as described, the combination with a plurality of magazines adapted to contain matrices of respectively different fonts, and a smaller plurality of distributors having a variable co-operating function, of adjustable font selecting mechanism associated with the distributors, and means adapted to automatically vary the font-selecting function of the distributors simultaneously with the variation of their co-operating function.

2. In a machine such as described, the combination with a plurality of magazines adapted to contain matrices of respectively different fonts, a smaller plurality of distributors having a variable co-operating function, and means whereby matrices of different fonts are caused to pass at different levels given points in their path towards the distributors, of means adapted to automatically vary such levels simultaneously with the variation of the co-operating function of the distributors.

3. In a machine such as described, the combination with a plurality of magazines adapted to contain matrices of respectively different fonts, a smaller plurality of distributors having a variable co-operating function, and means whereby matrices of different fonts are caused to pass at different levels given points in their path towards the distributors, of means whereby the level at which matrices of a given font pass a given point in their path towards the distributors may be automatically varied simultaneously with the variation of the co-operating function of the distributors.

4. In a machine such as described, the combination with a plurality of magazines adapted to contain matrices of respectively different fonts, and a smaller plurality of distributors having a variable co-operating function, of a series of font-selector bridges each adapted to select matrices of a given font by determining the level at which such matrices pass a given point in their path towards the distributors, such series constituting a font-selecting unit adjustable as a whole to bring any one of such bridges into operative position, and means for effecting such adjustment operated by or through an adjustment necessary for varying the co-operating function of the distributors.

5. In a machine such as described, the combination with a plurality of magazines adapted to contain matrices of respectively different fonts and a smaller plurality of distributors having a variable co-operating function, of a plurality of series of font-selector bridges, each adapted to select matrices of a given font by determining the level at which such matrices pass a given point in their path towards the distributors, constituting a plurality of font-selecting units adjustable simultaneously and independently to bring a corresponding plurality of such bridges into operative position, and means for effecting such adjustment operated by or through an adjustment necessary for varying the co-operating function of the distributors.

6. In a machine such as described, the combination with a plurality of magazines adapted to contain matrices of respectively different fonts, and a smaller plurality of distributors having a variable co-operating function, of a plurality of series of font-selector bridges, each adapted to select matrices of a given font by determining the level at which such matrices pass a given point in their path towards the distributors, constituting a plurality of font-selecting units adjustable conjointly to bring a corresponding plurality of such bridges into operative position, and means for effecting such adjustment operated by or through an adjustment necessary for varying the co-operating function of the distributors.

7. In a machine such as described the combination with a plurality of magazines adapted to contain matrices of respectively different fonts and a smaller plurality of distributors having a variable co-operating function, of an adjustable bridge-carrying member, a series of font-selector bridges mounted thereon, each adapted to select matrices of a given font by determining the level at which such matrices pass a given point in their path towards the distributors, and means adapted to adjust said member to bring one or another of such bridges into the said path when an adjustment necessary for varying the co-operating function of the distributors is effected.

8. In a machine such as described, the combination with a plurality of magazines adapted to contain matrices of respectively different fonts, a smaller plurality of distributors and magazine-moving means adapted to bring different groups of the magazines into operative relationship with the distributors, of an adjustable bridge-carrying member, a series of font-selector bridges mounted thereon, each adapted to select matrices of a given font by determining the level at which such matrices pass a given point in their path towards the distributors, a lever adapted to control the position of the bridge-carrying member to present one or another of such bridges in the said path, and means movable with the magazines adapted to control the position of the lever.

9. In a machine such as described, the combination with a plurality of magazines adapted to contain matrices of respectively different fonts, a smaller plurality of distributors, means adapted to move the magazines to bring different groups thereof into operative relationship with the distributors and magazine-locating devices adapted to unlock and lock the magazines before and after such movement, of an adjustable bridge-carrying member, a series of font-selector bridges mounted thereon, each adapted to select matrices of a given font by determining the level at which such matrices pass a given point in their path towards the distributors, a lever adapted to control the position of the bridge-carrying member to present one or another of such bridges in the said path, differently-located cam blocks movable with the magazines adapted to control the position of the lever, and means operated through the operation of the magazine-locating devices adapted to move the lever out of and back to operative contact with said cam blocks before and after movement of the magazines.

10. In a machine such as described, the combination according to claim 7, characterised by the font-selector bridges being removably mounted on the bridge-carrying member.

11. In a machine such as described, the combination with a plurality of magazines adapted to contain matrices of respectively different fonts, a smaller plurality of distributors, and magazine-moving means adapted to bring different groups of the magazines into operative relationship with the distributors, of a number of adjustable bridge-carrying members less by one than the number of distributors, a series of font-selector bridges mounted on each such member, each bridge adapted to select matrices of a given font by determining the level at which such matrices pass a given point in their path towards the distributors, means under the control of the magazine-moving means appropriate to each bridge-carrying member adapted to control the position of that member to present one or another of its bridges in the said path, means adapted to convey to a respective distributor matrices selected by each operative bridge, and means adapted to convey to the remaining distributor matrices not so selected.

12. In a machine such as described, the combination with a plurality of magazines adapted to contain matrices of different fonts, two distributors and magazine-moving means adapted to bring different pairs of the magazines into operative relationship with the distributors, of an adjustable bridge-carrying member, a series of font-selector bridges mounted thereon, each adapted to select matrices of a given font by determining the level at which such matrices pass a given point in their path towards the distributors, means under the control of the magazine-moving means adapted to control the position of said member to present one or another of its bridges in the said path, means adapted to convey to one of the distributors matrices selected by the operative bridge, and means adapted to convey to the other distributor matrices not so selected.

13. In a machine such as described, the combination with a plurality of magazines adapted to contain matrices of respectively different fonts, a smaller plurality of distributors and means adapted to bring different groups of the magazines into operative relationship with the distributors, of a number of bridge-carrying members less by one than the number of distributors, a series of font-selector bridges mounted on each such member, each bridge adapted to select matrices of a given font by determining the level at which such matrices pass a given point in their path towards the distributors, a lever appropriate to each bridge-carrying member adapted to control the position of that member to present one or another of its bridges in the said path, means movable with the magazines adapted to control the positions of the levers, means adapted to convey to a respective distributor matrices selected by each operative bridge, and means adapted to convey to the remaining distributor matrices not so selected.

14. In a machine such as described, the combination with a plurality of magazines adapted to contain matrices of respectively different fonts, a smaller plurality of distributors, means adapted to move the magazines to bring different groups thereof into operative relationship with the distributors and magazine-locating devices adapted to unlock and lock the magazines before and after such movement, of a number of adjustable bridge-carrying members less by one than the number of distributors, a series of font-selector bridges mounted on each such member, each bridge adapted to select matrices of a given font by determining the level at which such matrices pass a given point in their path towards the distributors, a lever appropriate to each bridge-carrying member adapted to control the position of that member to present one or another of its bridges in the said path, differently located cam blocks appropriate to the respective magazines and movable therewith adapted to control the positions of the levers, means operated by the magazine-locating devices adapted to move the levers out of and back to operative contact with said cam blocks before and after movement of the magazines, means adapted to convey to a respective distributor matrices selected by each operative bridge, and means adapted to convey to the remaining distributor matrices not so selected.

15. In a machine such as described, the combination with a plurality of magazines adapted to contain matrices of different fonts, two distributors, magazine-moving means adapted to bring different pairs of the magazines into operative relationship with the distributors, and magazine-locating devices adapted to unlock and lock the magazines before and after such movement, of an adjustable bridge-carrying member, a series of font-selector bridges mounted thereon, each bridge adapted to select matrices of a given font by determining the level at which such matrices pass a given point in their path towards the distributors, a lever adapted to control the position of the bridge-carrying member to present one or another of such bridges in the said path, differently located cam blocks movable with the magazines adapted to control the position of the lever, means operated by the magazine-locating devices adapted to move the lever out of and back to operative contact with said cam blocks before and after movement of the magazines, means adapted to convey to one of the distributors matrices selected by the operative bridge, and means adapted to convey to the other distributor matrices not so selected.

16. In a machine such as described, the combination with a plurality of magazines adapted to contain matrices of respectively different fonts, a smaller plurality of distributors and magazine-moving means adapted to bring different groups of the magazines into operative relationship with the distributors, of a plurality of adjustable bridge-carrying members, a series of font-selector bridges mounted on each such member, each bridge adapted to select matrices of a given font by determining the level at which such matrices pass a given point in their path towards the distributors, and means under the control of the magazine-moving means adapted to control the position of each bridge-carrying member to present one or another of its bridges in the said path.

17. In a machine such as described, the combination with a plurality of magazines adapted to contain matrices of respectively different fonts, a smaller plurality of distributors and means adapted to bring different groups of the magazines into operative relationship with the distributors, of a plurality of bridge-carrying members, a series of font-selector bridges mounted on each such member, each bridge adapted to select matrices of a given font by determining the level at which such matrices pass a given point in their path towards the distributors, a lever appropriate to each bridge-carrying member adapted to control the position of that member to present one or another of its bridges in the said path, and means movable with the magazines adapted to control the positions of the levers.

18. In a machine such as described, the combination with a plurality of magazines adapted to contain matrices of respectively different fonts, a smaller plurality of distributors, means adapted to move the magazines to bring different groups thereof into operative relationship with the distributors and magazine-locating devices adapted to unlock and lock the magazines before and after such movement, of a plurality of adjustable bridge-carrying members, a series of font-selector bridges mounted on each such member, each bridge adapted to select matrices of a given font by determining the level at which such matrices pass a given point in their path towards the distributors, a lever appropriate to each bridge-carrying member adapted to control the position of that member to present one or another of its bridges in the said path, differently located cam blocks appropriate to the respective magazines and movable therewith adapted to control the positions of the levers, and means operated by the magazine-locating devices adapted to move the levers out of and back to operative contact with said cam blocks before and after movement of the magazines.

19. In a machine such as described, the combination with a plurality of magazines adapted to contain matrices of respectively different fonts, a smaller plurality of distributors, means adapted to move the magazines to bring different groups thereof into operative relationship with the distributors and magazine-locating devices adapted to unlock and lock the magazines before and after such movement, of a bridge-carrying slide adjustable rectilinearly beneath a given point in the path of matrices towards the distributors, a series of font-selector bridges mounted stepwise thereon, each bridge adapted to select matrices of a given font by determining the level at which such matrices pass said given point, a lever operated through the operation of the magazine-locating devices adapted to reciprocate the slide during the unlocking and locking of the magazines and differently located cam blocks movable with the magazines adapted to determine the extent of such reciprocation.

20. In a machine such as described, the combination with a plurality of magazines adapted to contain matrices of respectively different fonts, a smaller plurality of distributors, means adapted to move the magazines to bring different groups thereof into operative relationship with the distributors and magazine-locating devices adapted to unlock and lock the magazines before and after such movement, of a number of bridge-carrying slides less by one than the number of distributors, each adjustable rectilinearly beneath a respective given point in the path of matrices towards the distributors, a series of font-selector bridges mounted stepwise on each slide, each bridge adapted to select matrices of a given font by determining the level at which such matrices pass the respective given point, a lever appropriate to each slide operated through the operation of the magazine-locating devices adapted to reciprocate the respective slide during the unlocking and locking of the magazines, differently located cam blocks movable with the magazines adapted to determine the extent of such reciprocation to locate a bridge of the respective series beneath the respective given point, means adapted to convey to a respective distributor matrices selected by each operative bridge, and means adapted to convey to the remaining distributor matrices not so selected.

21. In a machine such as described, the combination with a plurality of distributors, and adjustable selecting mechanism for directing matrices to the respective distributors according to form, of a magazine containing matrices of a given form, means whereby said magazine may be operatively connected to one or another of the distributors, and automatic means for adjusting the selecting mechanism to effect the delivery of the matrices contained in said magazine to the particular distributor with which it is connected.

22. In the machine such as described, the combination with a plurality of distributors, and adjustable selecting mechanism for directing matrices to the respective distributors according to form, of a magazine containing matrices of a given form and movable into operative relation to one or another of the distributors, and automatic means for adjusting the selecting mechanism to effect the delivery of the matrices contained in said magazine to the particular distributor with which it is brought into operative relation.

23. In a machine such as described, the combination of a matrix magazine movable to and from operative position, a distributor to cooperate with said magazine, adjustable selecting mechanism for directing to said distributor matrices of one form or another, and means controlled by the movement of said magazine to operative position for adjusting the selecting mechanism to effect the delivery to the distributor of matrices of the form contained in said magazine.

24. In a machine such as described, the combination of a magazine containing matrices of a given form and replaceable in operative position by another magazine containing matrices of a different form, a distributor, adjustable selecting mechanism for directing to said distributor matrices of one form or another, and means actuated by the replacement of the magazine for adjusting the selecting mechanism to effect the delivery to the distributor of matrices of the form contained in the substitute magazine.

25. In a machine such as described, the combination of a plurality of magazines containing matrices of different forms, a smaller plurality of distributors, adjustable selecting mechanism for directing matrices to the respective distributors according to form, means whereby the several distributors may be operatively connected to different groups of magazines, and automatic means for adjusting the selecting mechanism to effect the delivery to said distributors of matrices of the particular forms contained in the cooperating magazines.

26. In a machine such as described, the combination of a plurality of magazines containing matrices of different forms, a smaller plurality of distributors, adjustable selecting mechanism for directing matrices to the respective distributors according to form, means for moving the magazines to bring different groups thereof into operative relation to the several distributors, and means controlled by such movement of the magazines for adjusting the selecting mechanism to effect the delivery to said distributors of matrices of the particular forms contained in the operative group of magazines.

27. In a machine such as described, the combination of a plurality of magazines containing matrices of different forms, a smaller plurality of distributors, adjustable selecting mechanism for directing matrices to the respective distributors according to form, means for moving the magazines to bring different groups thereof into operative relation to the several distributors, and means controlled by such movement of the magazines for adjusting the selecting mechanism to effect the delivery to said distributors of matrices of the particular forms contained in the operative group of magazines, the said adjusting means including registering blocks associated with the respective magazines and controlling the extent of adjustment of the selecting mechanism.

28. A combination as specified in claim 27, characterized by the fact that the magazines are interchangeable in position with each other and that the registering blocks are attached directly to the magazines; whereby the proper adjustment of the selecting mechanism is insured in any condition of the magazines.

29. In a machine such as described, the combination of a plurality of magazines containing matrices of different forms, a smaller plurality of distributors, and selecting mechanism for directing matrices to one or another of the distributors according to form, the said mechanism including a plurality of selector bridges adjustable to bring any desired one into operative position, with means whereby the several distributors may be operatively connected to different groups of magazines, and automatic means for effecting the adjustment of the selector bridges so as to adapt the selecting mechanism to the particular group of magazines in operative connection with the distributors.

30. In a machine such as described, the combination of a plurality of magazines containing matrices of different forms, a smaller plurality of distributors, and selecting mechanism for directing matrices to one or another of the distributors according to form, the said mechanism including a plurality of selector bridges adjustable to bring any desired one into operative position, with means for moving the magazines to bring different groups thereof into operative relation to the several distributors, and means controlled by such movement of the magazines for effecting the adjustment of the selector bridges so as to adapt the selecting mechanism to the particular group of magazines in use.

In testimony whereof I have affixed my signature hereto.

JOHN ERNEST BILLINGTON.